United States Patent
Leempoel et al.

(10) Patent No.: US 6,780,926 B2
(45) Date of Patent: Aug. 24, 2004

(54) PROCESS FOR THE MANUFACTURING OF ORGANOPOLYSILOXANE COMPOSITIONS

(75) Inventors: Patrick Leempoel, Brussels (BE); Francois De Buyl, Hoeilaart (BE); Patrick Deglasse, Ecaussinnes (BE)

(73) Assignee: Dow Corning S.A., Seneffe (BE)

( * ) Notice: Subject to any disclaimer, the term of this patent is extended or adjusted under 35 U.S.C. 154(b) by 0 days.

(21) Appl. No.: 10/008,282

(22) Filed: Nov. 7, 2001

(65) Prior Publication Data

US 2002/0091221 A1 Jul. 11, 2002

(30) Foreign Application Priority Data

Nov. 21, 2000 (GB) .............................................. 0028254

(51) Int. Cl.$^7$ ................................................. C08K 3/22
(52) U.S. Cl. ...................... 524/588; 524/432; 524/449; 524/445; 524/431; 524/425
(58) Field of Search ............................... 524/588, 425, 524/432, 449, 431, 445

(56) References Cited

U.S. PATENT DOCUMENTS

| | | |
|---|---|---|
| 3,517,001 A | 6/1970 | Berger |
| 3,708,467 A | 1/1973 | Smith et al. |
| 4,100,129 A | 7/1978 | Beers |
| 4,102,852 A | 7/1978 | DeLaTorre et al. |
| 4,418,165 A | 11/1983 | Polmanteer et al. |
| 5,534,588 A * | 7/1996 | Knepper et al. ............. 524/730 |
| 5,616,647 A * | 4/1997 | Dziark et al. ................ 524/788 |
| 5,789,480 A * | 8/1998 | Adachi et al. .............. 524/863 |
| 5,962,583 A * | 10/1999 | Beljanski et al. ........... 524/779 |
| 6,413,354 B1 * | 7/2002 | Haas et al. .................. 156/329 |

FOREIGN PATENT DOCUMENTS

| | | |
|---|---|---|
| EP | 342025 | 11/1989 |
| EP | 778307 | 6/1997 |
| EP | 802233 | 10/1997 |
| EP | 739652 | 5/2001 |

* cited by examiner

*Primary Examiner*—Margaret G. Moore
(74) *Attorney, Agent, or Firm*—Robert L. McKellar; McKellar Stevens, PLLC (57) ABSTRACT

This invention provides a process for the manufacture of organopolysiloxane compositions, an in particular sealants, comprising mixing a polymer, preferably silicone, a surface active filler, an organosilane such as a cross-linker, a catalyst and an adhesion promoter, in which the organosilane (iii) is mixed with surface active filler (ii) prior to the introduction of the adhesion promoter. The resulting sealant compositions have improved adhesion properties.

14 Claims, 2 Drawing Sheets

PROCESS FOR THE MANUFACTURING OF ORGANOPOLYSILOXANE COMPOSITIONS

TECHNICAL FIELD

The present invention relates to a process for the manufacture of organopolysiloxane compositions, and in particular organopolysiloxane compositions which cure to elastomeric solids.

BACKGROUND AND PRIOR ART

Organopolysiloxane compositions which cure to elastomeric solids are well known. Typically such compositions are obtained by mixing a polydiorganosiloxane having reactive terminal groups, generally silanol groups, with an organosilane cross-linking agent for the polydiorganosiloxane, for example an alkoxy silane, an acetoxy silane, an oximo silane, alkenyloxy silane or an amino silane. These materials are frequently curable upon exposure to atmospheric moisture at room temperature.

One important application of the above-described curable compositions is their use as sealants in which there is formed an elastomeric mass between surfaces which is adherent to at least two such surfaces.

Fillers used in these compositions may be divided into two types, reinforcing fillers and extending fillers. Reinforcing fillers are usually of small particle size and typically are surface active in that they contain reactive groups on their outer surface. Examples of reinforcing fillers include fumed silica, calcined silica, precipitated silica, titania, zinc oxide, clay and mica all of which are used for the purpose of imparting mechanical strength to the cured products.

Extending fillers include ground calcium carbonate, magnesium carbonate, quartz, diatomaceous earth, barium sulphate, and calcium sulphate. It is also to be noted that some fillers, such as precipitated calcium carbonate, can be considered as semi-reinforcing in that they provide compositions with a degree of reinforcement.

One important requirement of such sealant materials is the ability to adhere well to a variety of substrates. For example, the use of plastics in various industries, particularly the construction industry, is increasing. This is especially true for plastics such as polyvinyl chloride (PVC), used for window frames, polymethylmethacrylate (PMMA), used for bathtub and bathroom accessories, and polycarbonate (PC) such as Lexan, used as transparent sheeting material or for the manufacture of safety glass laminates and insulating glass units. Other substrates to which sealants are expected to adhere include, for example, polyvinylidene fluoride or polyesters which tend to be used to coat metal surfaces.

Whilst many sealants containing extending fillers such as calcium carbonate are known to develop sufficient adhesion to the plastics discussed above, sealants containing silica reinforcing filler materials typically show poorer plastic adhesion properties.

Some reinforcing fillers have a tendency to "structure" (i.e. form an elastic mass before cure, impeding the normal processing operations such as moulding and extrusion) and to agglomerate in the sealant composition which can lead to premature crepe hardening. To reduce this tendency, reinforcing fillers can be surface treated with hydrophobing agents prior to use. Suitable hydrophobing agents include, for example, organochlorosilanes, organopolysiloxanes, and hexamethyldisilazanes. Whilst such surface treated fillers "give" good plastic adhesion, they are expensive and cause negative rheological effects to resulting sealant compositions.

Consequently, a common practice in sealant manufacture is to include adhesion promoters in the sealant compositions in order to enhance adhesion to various substrates, and in particular plastics, especially PVC, PMMA and PC. Commonly used adhesion promoters include, for example, alkoxy silanes such as aminoalkylalkoxy silane, epoxyalkylalkoxy silane, mercaptoalkylalkoxy silane, and derivatives thereof.

Another group of compounds which have been used as adhesion promoters for some considerable time are silicon containing isocyanurates as described, for example, in U.S. Pat. Nos. 3,517,001, 3,708,467 and 4,100,129 (General Electric Company). Typically these comprise:

wherein one D substituent is $-R_y-Si-(R''_x)(OR''_{3-x})$, in which R is a divalent hydrocarbon radical selected from alkylenearylene, alkylene, cycloalkylene and halo-substituted derivatives thereof, R'' is an alkyl or haloalkyl radical with up to 8 carbon atoms, x is from 0 to 3 and y is 1. The remaining D substituents are selected from $-R_y-Si-(R''_x)(OR''_{3-x})$ as described above, styryl, vinyl, allyl, chloroallyl or cyclohexenyl.

However, we have found that the mere presence of adhesion promoters is not always sufficient to provide reliable adhesion on plastics. This has been found to be particularly the case in compositions containing alkoxy silane cross-linkers, especially when they contain silica as filler.

Surprisingly, the inventors have found that the position at which the adhesion promoter is added relative to the other components of the organosiloxane composition in the process of manufacture of organosiloxane compositions suitable as sealants can significantly effect adhesion properties, especially to plastic substrates, of the compositions.

U.S. Pat. No. 3,517,001 describes the preparation of a variety of silicon containing isocyanurates of the type indicated above and indicates their use as adhesion promoters within silicone compositions. U.S. Pat. No. 3,708,467 and U.S. Pat. No. 4,100,129 both describe sealant compositions containing a silanol-terminated polydiorganosiloxane, a silane cross-linking agent, a titanate catalyst and optionally fillers such as silicas and isocyanurate adhesion promoters. Preferred uses for such compositions including being sealants and caulking compounds.

The preferred process for making such sealants in the presence of an adhesion promoter is combining all the ingredients other than the silane cross-linker, the titanate catalyst and the adhesion promoter to form a base blend, removing moisture and adding the silane cross-linker, titanate catalyst and adhesion promoter just prior to packaging the resulting composition. U.S. Pat. No. 4,102,852 describes a one component self extinguishing cured silicone composition using dimethyl and phenyl-methyl hydroxy polysiloxane polymers in combination with a selection of reinforcing and extending fillers as well as carbon black. The catalyst is a dialkoxy chelated titanium and an adhesion promoter, preferably 1,3,5-tris (trimethoxysilylpropyl) isocyanurate, may be used. The composition is prepared by mixing all the ingredients in any order desired, however a preferred process consists of adding the carbon black and then the other fillers into the polymer, then the cross-linker and finally the titanate catalyst "and/or any additional optional additives are mixed into the composition". It is indicated that a drying cycle must occur prior to the addition of the cross-linker and catalyst. In the examples, the adhesion promoter is added via a premix made of the catalyst, cross-linker and adhesion promoter so that all the silanes and the titanate catalyst are added in 1 step at the end of the manufacturing process.

The above process may be appropriate in certain circumstances but it is often found that such a method can lead to a poor sealant rheology and slumping, particularly if the catalyst and cross-linker are added into the reaction mixture after the addition of the filler.

The inventors have identified an improved process for the preparation of an organopolysiloxane composition suitable for use as a sealant which provides a resulting sealant with significantly improved adhesive properties.

SUMMARY OF THE INVENTION

According to a first aspect of the invention, there is provided a process for making an organopolysiloxane composition comprising mixing the following components:
i) a polymer having not less than two groups bonded to silicon which are hydroxyl or hydrolysable groups or a partial condensate thereof;
ii) a surface active filler;
iii) an organosilane comprising at least two silicon bonded reactive groups;
iv) a catalyst; and
v) an adhesion promoter characterised in that organosilane (iii) is mixed with surface active filler (ii) prior to the introduction of the adhesion promoter.

According to a second aspect of the invention, there is provided an organopolysiloxane composition obtainable by the process according to the first aspect.

According to a third aspect of the invention, there is provided a sealant composition comprising an organosiloxane composition of the second aspect.

DETAILED DESCRIPTION OF THE INVENTION

Definitions

Unless specifically stated otherwise, all % by weights are % by weight of the organosiloxane composition.

Unless specifically stated otherwise, all viscosity values are as measured using Dow Corning Corporate Test Method (CTM) 0050, October 1970.
Organosiloxane Composition
Polymer (i)

The polymer is according to the general formula W-B-W where B may be any desired organic or siloxane molecular chain, for example a polyoxyalkylene chain, a polyisobutylene or a polydiorganosiloxane chain. Preferably, B is a polydiorganosiloxane chain and therefore preferably includes siloxane units of the formula $R^2{}_s SiO_{(4-s)/2}$ in which $R^2$ represents an alkyl group, having from 1 to 6 carbon atoms, for example a methyl group, a vinyl group having from 1 to 6 carbon atoms a phenyl group, or a halo-substituted alkyl group, preferred halogen substituents being chlorine or fluorine, and s has a value of 0, 1 or 2. Preferred materials are linear materials, i.e. s=2 for all units, thereby having polydiorganosiloxane chains according to the general formula $-(R^2{}_2 SiO)_t-$ in which each $R^2$ represents a methyl group or ethyl group and t has a value from about 200 to about 1500.

At least some of the W groups of the polymeric material comprise of hydroxyl or hydrolysable groups selected, for example, from $-Si(R^2)_c(OH)_{3-c}$, $-Si(R^2)_d(OR^3)_{3-d}$ and $-Si(R^2)_2-R^4-Si(R^2)_k(OR^5)_{3-k}$ where $R^2$ is as aforesaid, and is preferably methyl or ethyl but most preferably methyl, $R^4$ is a divalent hydrocarbon group which may be interrupted by one or more siloxane spacers having up to six silicon atoms, each $R^3$ is an alkyl or oxyalkyl group in which the alkyl groups have up to 6 carbon atoms, each $R^5$ is an alkyl group having up to 6 carbon atoms; each of c, d and k have the value 0, 1 or 2. Preferably, $R^4$ is either a methylene or ethylene group, each $R^3$ and $R^5$ is independently a methyl or ethyl group, c is equal to 2 and d and k are equal to 0 or 1. Most preferably $R^4$ is an ethylene group, k is 0 and $R^5$ is an ethyl group.

Other end groups which may optionally be present in addition to the hydroxyl or hydrolysable groups have the formula $-Si(R^2)_3$ wherein each $R^2$ is as previously described but is preferably a methyl group. Most preferred is a polydialkylsiloxane terminated with groups of the formula $-Si(CH_3)_2-(R^4)_2-Si(OR^5)_3$ where each $R^4$ is a methylene or ethylene group and each $R^5$ is as described previously and is preferably a methyl or ethyl group.

Suitable polymer materials have viscosities in the order of about 500 mPa·s to about 200,000 mpa·s. Suitably, the polymer is present in an amount of from 35 to 90% by weight, preferably from 45 to 55% by weight.
Surface Active Filler (ii)

The surface active filler is a reinforcing or semi-reinforcing filler. By "surface active" filler is meant a filler which presents functional groups at the filler particle surface. For example, silica filler particles typically present silanol groups on their surface, clays typically bear hydroxyl and silanol groups on their surface and calcium carbonate is typically surface passivated by a layer of fatty acids.

Suitable surface active fillers for use in the organosiloxane composition include silica, titania, zinc oxide, clay, mica and precipitated calcium carbonate. Preferably the surface active filler is selected from calcium carbonate and silica. More preferably, the surface active filler is a high surface area fumed silica, calcined silica or precipitated silica.

Suitably, the surface active filler is present in an amount of from 5 to 40% by weight, preferably from 6 to 20% by weight, more preferably from 8 to 15% by weight.
Organosilane (iii)

The organosilane is preferably present as a cross-linker. Suitable organosilane cross-linkers are selected from silanes having alkoxy, acetoxy, oximo, alkenyloxy or amino substituents. Preferably the cross-linker is an alkoxysilane of the general formula $(R^2)_{4-n}Si(OR^3)_n$ wherein $R^2$ and $R^3$ are as aforesaid and n has a value of 2, 3 or 4. More preferred organosilanes are those wherein $R^2$ represents an alkyl group having 1 to 6 carbon atoms for example methyl, ethyl, isopropyl or isobutyl or an alkenyl group such as vinyl, $R^3$ represents methyl or ethyl and n is 3. Examples of operative organosilanes are methyl trimethoxy silane, vinyl trimethoxy silane, methyl triethoxy silane, and vinyl triethoxy silane, isopropyl trimethoxy silane, propyl trimethoxy silane, phenyltrimethoxysilane, tetraethoxysilane and isobutyl trimethoxy silane.

A sufficient amount of organosilane cross-linker is employed to ensure adequate stability of the composition during storage and adequate cross-linking of the composition when exposed to atmospheric moisture. Suitably, the organosilane is present in an amount of from 0.5 to 5% by weight, preferably from 1.5 to 3% by weight.
Catalyst (iv)

The catalyst may be any suitable catalyst which accelerates the reaction process. Suitable catalysts are organic salts of metals such as titanium and zirconium tetra isopropyl titanate and tetra n butyl titanate and tetra tertiary butyl titanate. If a more rapid cure is desired, a chelate, for example a β-diketone or β-keto-ester, may be added to the mixture. Those β-diketone or β-keto-ester materials conventionally used as accelerators for titanium catalysts may be employed, for example ethyl aceto acetate and methyl aceto acetate.

Alternatively the catalyst may comprise a mixture and/or reaction product of
(i) a compound (i) selected from $M[OR^6]_4$ and $M[OR']_b[Z]_z$
 wherein
  M is titanium or zirconium;
  each $R^6$ and R' is the same or different and is a primary, secondary or tertiary aliphatic hydrocarbon;
  Z is a group of the formula —O—E—O— wherein E is an alkylene group comprising 1 to 6 carbon atoms or a branched alkylene radical comprising 1 to 6 carbon atoms; and
  z is 0 or 2 in which case when b is 0, z is 2 and when b is 2, z is 1; and
(ii) a compound of the general formula wherein
 $R^1$ is selected from a methylene group and a substituted methylene radical having 1 to 6 carbon atoms;
 A is selected from $-(CX_2)_rC(R^7)_3$ wherein r is from 0 to 5 and an adamantyl group or a derivative thereof;
 B is selected from
  $(CX_2)_mC(R^7)_3$ wherein m is from 0 to 5;
  a monovalent alkyl group having from 1 to 6 carbon atoms; and
  $OR^8$, wherein $R^8$ is selected from the group of $-(CX_2)_mC(R^7)_3$ and a monovalent alkyl group having from 1 to 6 carbon atoms;
 wherein
  each X is the same or different and is selected from the group of a halogen radical and hydrogen;
  each $R^7$ is the same or different and is selected from the group of a halogen radical and an alkyl radical having one to eight carbon atoms; and
  when r is greater than 0 at least one of X or $R^7$ is a halogen radical as described in WO 01/49789 (Dow Corning).

Further alternative catalysts which may be used include, for example, metal salts of carboxylic acids, such as lead octoate and dibutyltin dilaurate, dibutyltin diacetate, stannous octoate and chelated tin catalysts such as di(n-butyl)tin bis(ethylacetoacetate) and di(n-butyl) tin bis(acetylacetonate). It is to be noted that these latter catalysts may alternatively be used as co-catalysts in combination with the titanate catalysts discussed above.

Suitably, the catalyst is present in an amount of from 0.5 to 5% by weight, preferably from 1.5 to 3% by weight.

Adhesion Promoter (v)

Suitable adhesion promoters to which the present invention is applicable include those having at least one hydrolysable group, having the formula wherein
 R" is an alkyl or haloalkyl radical with up to 8 carbon atoms;

Q is a saturated, unsaturated or aromatic hydrocarbon radical functionalised by a group selected from amino, mercapto, ether, epoxy, isocyanato, cyano, isocyanurate acryloxy and acyloxy and mixtures thereof; and
q is 0 to 3.

Preferred adhesion promoters include:

wherein
 one D substituent is $-R_y-Si-(R''_x)(OR''_{3-x})$, in which
  R is a divalent hydrocarbon radical selected from alkylenearylene, alkylene, cycloalkylene and halo substituted derivatives thereof;
  R" is an alkyl or haloalkyl radical with up to 8 carbon atoms; and
  x is from 0 to 2 and y is 0 or 1; and the remaining D substituents are selected from $-R_y-Si-(R'')_x(OR'')_{3-x}$ as described above, with the exception that x may be 0 to 3, styryl, vinyl, allyl, chloroallyl and cyclohexenyl groups.

A preferred adhesion promoter of this type is a 1,3,5-tris (trimethoxysilylpropyl) isocyanurate.

Other suitable adhesion promoters include aminoalkyla-lkoxy silanes, epoxyalkylalkoxy silanes, for example, 3-glycidoxypropyltrimethoxysilane and mercaptoalkyla-lkoxy silanes. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyltrimethoxysilane.

A mixture of adhesion promoters may be employed comprising two or more adhesion promoters.

Suitably, the adhesion promoter is present in an amount of from 0.2 to 6% by weight, preferably 0.8 to 3% by weight.

Optional Ingredients

One or more other finely divided, extending fillers such as crushed quartz, diatomaceous earths, barium sulphate, iron oxide, and carbon black may also be present in the composition. The proportion of such fillers employed will depend on the properties desired in the elastomer-forming composition and the cured elastomer. Usually the amount of extending filler present will be in the range of from about 5 to about 150 parts by weight per 100 parts by weight of the polymer (i).

Another conventional ingredient which can be employed is a plasticiser. Plasticisers are introduced in order to reduce the modulus of the cured elastomer. A typical example of a plasticisers for this type of composition (i.e. organosiloxane elastomers) is a polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100,000 mpa·s and can be employed in amounts up to about 80 parts per 100 parts by weight of the polymer (i). Suitably, plasticiser may be present in an amount of from 0 to 40% by weight and preferably from 30 to 40% by weight.

Other additional ingredients may include pigments;

water scavengers, which are typically the same compounds as those used as cross-linkers or silazanes;

rheological additives for improving toolability of the composition, which may suitably be present in an amount of from 0 to 5% by weight, preferably 1.5 to 2.5% by weight. Examples of suitable rheological additives include silicone organic co-polymers such as those described in EP 802233 (Dow Corning);

fungicides, which may suitably by present in an amount of from 0 to 3% by weight, preferably 0.8 to 1.5% by weight.

The resulting organosiloxane product may be used as a sealant for glass, plastic, metals, wood, painted wood and the like.

Process of Manufacture

As described above, it is an essential step of the present invention to ensure that the mixture containing both the organosilane (iii) and filler (ii) is mixed prior to the addition of the adhesion promoter. Preferably, the organosilane and filler components are mixed for a period of time and to a sufficiently high degree such that they are substantially homogenous with respect to each other by the time the adhesion promoter is added. The organosilane and filler components should at least be intimately mixed prior to coming into contact with a the substantial part of the adhesion promoter.

Preferably the organosilane (iii) in the form of a cross-linker, catalyst (iv) and polymer (i) are mixed together prior to adding the filler. This premixing stage can take any form but it is particularly preferred to ensure that the catalyst and organosilane cross-linker are introduced into the mixture prior to the filler because addition of these components subsequent to the filler has a tendency to lead to slump problems in the resulting composition.

The organosilane cross-linker and catalyst are most preferably mixed together to form a premix prior to combination with the polymer and the polymer/premix mixture is thoroughly mixed prior to combination with the surface active filler.

The adhesion promoter may, for example, be added on its own, or in combination with an amount of any of the other ingredients other than the filler. Hence, the adhesion promoter may be added in combination with a rheology modifier and/or a fungicide or may alternatively may be added in combination with a proportion of the polymer, plasticiser, when present and a catalyst or co-catalyst.

Organosiloxane compositions according to the invention can be manufactured in either batch or continuous operations. In a batch type operation in accordance with the present invention there is provided a process comprising the steps of a) loading polymer (i), organosilane (iii) and catalyst (iv) into an appropriate mixer and mixing thoroughly to form a blend;

b) adding the surface active filler (ii) into the blend ensuring that it is thoroughly dispersed for a predetermined period of time;

c) adding the or each adhesion promoter (v) and mixing until a final product is sufficiently homogeneous; and d) devolatilising the resulting mixture of step (b) and/or the final product of step (c).

It is preferred that a plasticiser, particularly a polydimethylsiloxane having terminal trimethylsiloxy groups and a viscosity of about 100 mpa·s, is introduced into the mixture concurrent with the polymer. Preferably the organosilane cross-linker and catalyst, optionally in combination with a water scavenger, are premixed prior to mixing with the polymer and optional plasticisers. In a preferred process a rheology modifier and/or fungicide may be added into the composition at any stage of the mixing process.

Any appropriate continuous reactor suitable for making compositions of the type described in the present invention may also be utilised, providing the equipment enables the addition of an adhesion promoter subsequent to the cross-linker-surface active filler interaction.

Examples of continuous systems for the present invention include the continuous reactor described in EP0512730 (Dow Corning) which comprises a screw extruder having two mixing zones interlinked by an external residence zone.

In a process in accordance with the present invention there is provided a continuous process utilising a screw extruder having two mixing zones interlinked by an external residence zone comprising the steps a) mixing polymer (i), catalyst (iv), organosilane (iii) in the first mixing zone prior to the introduction of surface active filler (ii);

b) introducing surface active filler (ii) into the mixture resulting from step (I) in the first mixing zone and mixing until thoroughly dispersed, prior to entry onto the external residence zone; and c) introducing one or more adhesion promoters (v) into the second mixing zone.

It is preferred that optional additives such as plasticisers and/or water scavengers are, when required, introduced in to the first mixing zone and are mixed prior to the introduction of surface active filler. The surface active filler is introduced into the first mixing zone such that it is thoroughly dispersed into the mixture prior to reaching the external residence zone, such that the period of time in the residence zone is utilised for the modification of the surface active filler. By-products such as water are extracted in the second mixing zone. In such a system an input port may be introduced in the second mixing zone at an appropriate position such that the adhesion promoter can be introduced into the system at a point where it is homogenously mixed into the composition prior to packaging or alternatively an additional addition and mixing stage may be introduced after the second mixing zone for the introduction of the adhesion promoter.

A further alternative continuous process may utilise a continuous mixer of the type described in EP0739652 (Dow Corning Toray Silicone). In this instance the process comprises supplying (a) a premix of polymer (i), organosilane (iii) and catalyst (iv), and (b) a surface active filler (ii) to a continuous mixing apparatus comprising a cylindrical body casing having a material feed opening at the top of said casing, a mixture discharge outlet at the bottom of said casing, a rotating disk within the casing, where the ratio of the diameter of the rotating disk to the inside diameter of said casing is 0.80 to 0.95; an upper mixing compartment above said rotating disk and a lower mixing compartment below said rotating disk. The process comprises mixing said premix (I) with said surface active filler (II) in said upper mixing compartment by rotation of said disk to form a mixture, transferring said mixture into said lower mixing compartment and then adding one or more adhesion promoters prior to, subsequent to or concurrent with discharging said mixture through said discharge outlet.

Preferably subsequent to discharging the mixture, the mixture is de-aired in a de-airer and the adhesion promoter (v) is introduced into the resulting mixture during passage of the mixture through the de-airer.

Without being limited by theory, the inventors believe that in previous processes, where the adhesion promoter is introduced prior to or concurrent with filler, an interaction can occur between the adhesion promoter and the filler surface during the mixing process resulting in the "trapping" of a significant proportion of the adhesion promoter. This results in a significant reduction in the effectiveness of the adhesive properties of the resulting composition. Consequently, it is believed that by mixing the surface active filler (ii) with the organosilane prior to addition of the adhesion promoter, the surface of the filler is modified in situ by reaction with the organosilane (iii), thus inhibiting the interaction of the adhesion promoter with the filler.

As described above, it is an essential step of the present invention to ensure that the mixture containing both the organosilane (iii) and filler (ii) is mixed for a period of time prior to the addition of the adhesion promoter. The precise period of time required to obtain the benefit of the invention will vary depending on the actual process and apparatus used. However, the skilled person can establish this by routine experimentation, either by adding the adhesion promoter at different times post mixing of the filler and organosilane components in a batch process, or by adding the adhesion promoter at different points in the mixing process downstream of points of addition of the filler and organosilane components in a continuous process.

The resulting products, for example a sealant, from any of the above processes in accordance with the invention provides significantly improved adhesion between sealant and a substrate such as glass or a window frame. It is believed that this is because substantially more of the adhesion promoter is available to react both within the product matrix and at the sealant/substrate interface.

Without being limited by theory, it is believed that previous compositions not utilizing the process described herein resulted in final products containing a significant amount of the adhesion promoter which had interacted with the filler.

The present invention will now be further described with reference to the accompanying drawings.

DETAILED DESCRIPTION OF THE DRAWINGS

Figure 1:
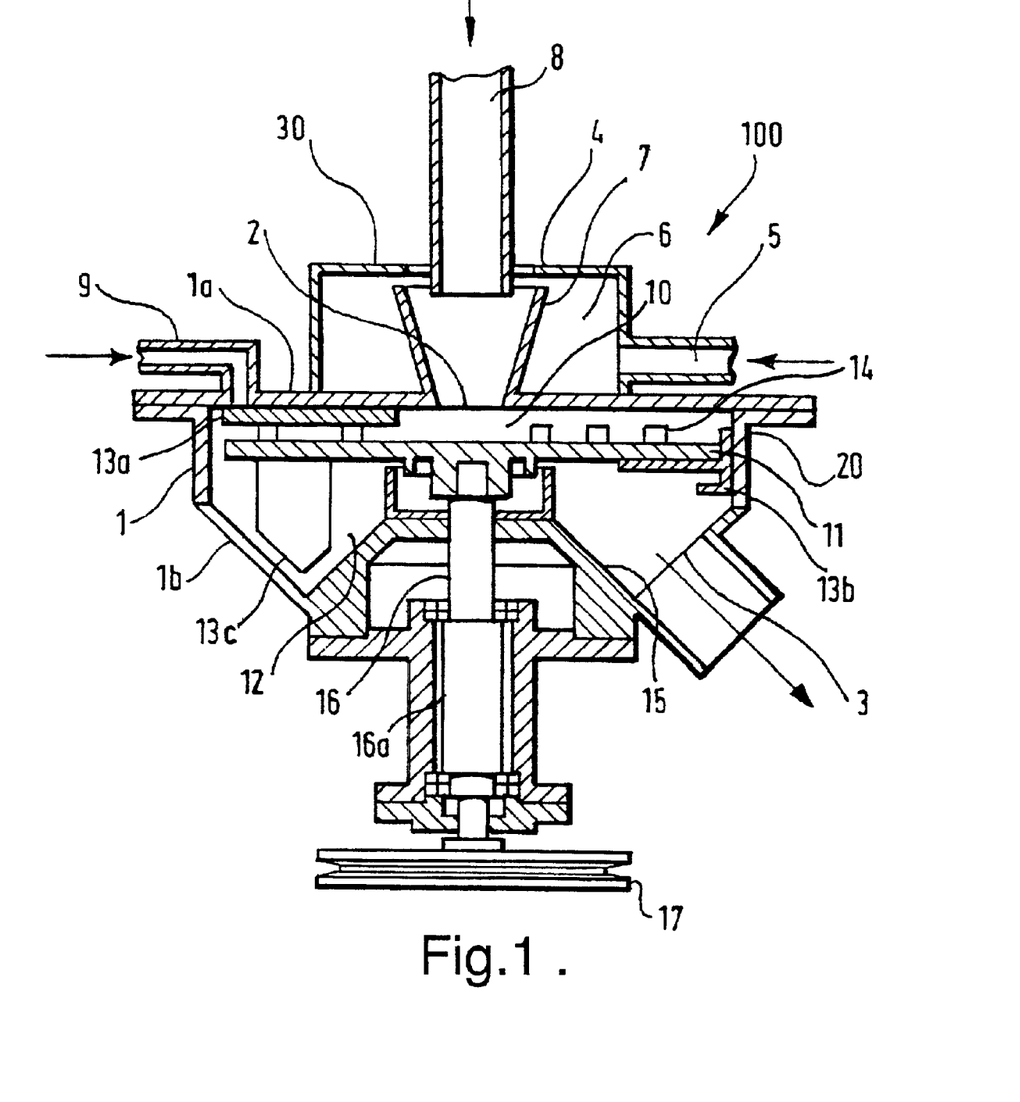
FIG. 1 is a plan view of a continuous mixing apparatus for use in the process of the invention.

FIG. 1 shows a continuous mixer (FUNKEN POWTECHS, INC—Japan), generally designated (100), for use in the process of the present invention.

The mixer comprises a mixer body (20) and a material feed section (30) for the mixer. A cylindrical body casing (1) forms the outer shell of the mixer body (20), and a feed opening (2) receives a feed mixture that is provided at the centre an upper plate (1a) of the body casing (1). The lower part of the body casing forms an inclined surface (1b) having the shape of an inverted cone, and a discharge outlet (3) is installed in said inclined surface (1b). A conical element (15) is provided at the centre of the casing bottom so as to form an annular V-shaped bottom with inclined surface (1b).

A cylindrical feed section casing (4) forms the outer shell of the material feed section (30). An inlet (5) is connected at the side of a feed section casing (4), and a reservoir (6) is formed within feed section casing (4). An overflow tube (7) having the shape of an inverted cone is connected on the top of the feed opening (2) on the mixer body (20). This overflow tube (7) ascends substantially vertically and forms the inner wall of reservoir (6). The lower end of a feed conduit (8) faces the inlet to overflow tube (7).

A rotating disk (11) is installed horizontally within the body casing (1) of the mixer body (20) to face the feed opening (2). This rotating disk (11) divides the casing interior into an upper mixing compartment (10), where a first-stage mixing operation is implemented, and a lower mixing compartment (12), where a second-stage mixing operation is implemented. The centre of rotation of the rotating disk (11) is fixed on the upper end of a rotating axle (16). Said rotating axle (16) is supported by a bearing element (16a) and extends to the exterior of casing (1). A pulley (17) is fixed at the bottom end of rotating axle (16), and the power for rotation is provided by an electric motor (not shown). The preferred range for rotation is from 400 to 3,000 rpm. An additive inlet (9) is provided in upper plate (1a), which additive inlet (9) opens into the upper mixing compartment (10) so that additives may be introduced into the continuous mixer (100) concurrent with the addition of, for example, a filler/JSCP mixture. The upper surface, outside edge, and lower surface of the rotating disk (11) each carry two or more scrapers (13a), (13b) and (13c). Usually three of each type of scraper (13a), (13b) and (13c) are used but scrapers (13b) on the outer edge of rotating disk (11) may be omitted. Typically, a mixture is mixed by a combination of the stirring action of rotating disk and the stirring and/or scraping actions of these scrapers.

Mixing proceeds as follows: the scrapers (13a) in the upper mixing compartment (10) scrape off the mixture adhering to the upper plate (1a); the scrapers (13b) scrape off the mixture adhering on the inner wall of the casing at the boundary between the upper mixing compartment (10) and the lower mixing compartment (12); and the scrapers (13c) in the lower mixing compartment (12) scrape off the mixture adhering on the inclined surface (1b) of the casing bottom.

The ratio of the diameter of the rotating disk (11) to the inside diameter of the cylindrical body casing (1) is particularly important to the quality of the dispersion of the filler, and values from 0.8 to 0.95, preferably from 0.85 to 0.9 are required herein. A ratio of less than 0.8 will produce deficient dispersion due to a "short pass" by the mixture and a ratio above 0.95 does produce dispersion, but does not permit transfer of the mixture into the lower mixing compartment (12).

The upper surface of rotating disk (11) may also comprise a large number of vertical mixing pins (14), which further promote homogeneity. A conforming jacket may be provided for purposes of temperature control over the outer surface of the cylindrical body casing (1) of the mixer body (20).

The mixing apparatus described in FIG. 1 can suitably be utilised as follows in a system for in making organosiloxane compositions according to the present invention. An organosilane cross-linker/catalyst/polymer mixture (SCP mixture) and optionally a plasticiser is fed into the material feed section (30) through inlet (5) while the surface active filler is introduced from feed conduit (8). The SCP mixture supplied by inlet (5) is first stored in reservoir (6), and then flows down the inner wall of overflow tube (7) from the top edge thereof. At this point, the surface active filler supplied through feed conduit (8) is mixed into said SCP mixture and the resulting surface active filler/SCP mixture descends into feed opening (2).

In the above apparatus, the surface active filler/SCP mixture entering the upper mixing compartment (10) from the feed opening (2) is subjected, while being radially transported outward on the rotating disk (11), to the first-stage mixing process based on stirring and scraping by the scrapers (13a) and mixing pins (14). The surface active filler/SCP mixture that has been mixed in the first-stage mixing process is then subjected to the second-stage mixing process based on shear between the circumference of the rotating disk (11) and the interior wall of the cylindrical body casing (1) combined with stirring and scraping by the scrapers (13b). The mixture that has been transported to the lower mixing compartment (12) then descends onto the inclined surface (1b) and is sheared while being scraped by the ends of the scrapers (13c). The resulting additional dispersion of surface active filler induces a further lowering of the viscosity of the mixture. The mixture is then discharged through the discharge outlet (3). Considerations of the quality of the dispersion make it preferable for the filler/SCP/additive mixture in the lower mixing compartment (12) to reach a temperature from 120 to 150° C.

Figure 2:
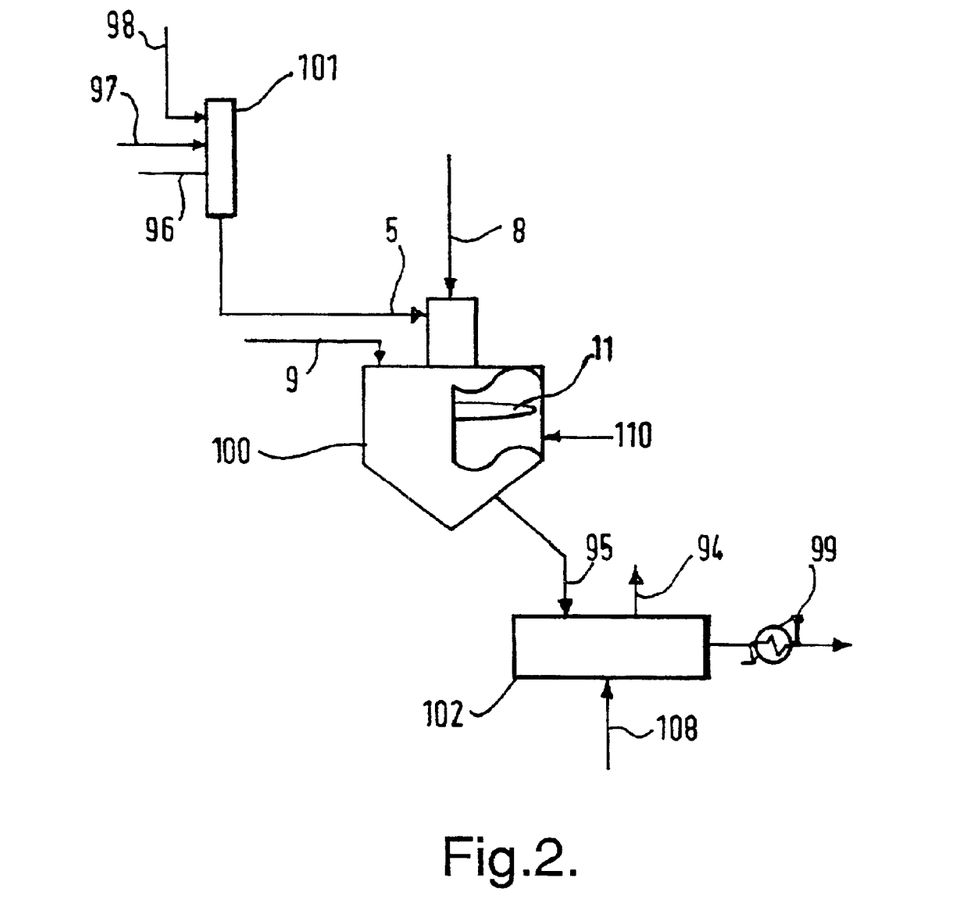
FIG. 2 is a schematic drawing of a mixing system for use in the process of the invention.

FIG. 2 shows a schematic view of a mixing system for preparing organopolysiloxane compositions as described in the present invention.

The mixing system comprises four main components, a mixer (101), the continuous mixer (100) as described above, a twin-screw de-airer (102) and a cooler (99), and can suitably be utilised as follows in to make organosiloxane compositions according to the present invention. A polymer, optional plasticiser, and a premix of catalyst and cross-linker are introduced into mixer (101) by way of supply lines 98, 97 and 96 respectively and are mixed together in mixer (101) before being fed to inlet 5 of continuous mixer (100). Surface active filler is introduced into mixer (100) through conduit (8). These ingredients are mixed together due to the high rotation speed of the disk (11) and the presence of mixing cams on it. The highest mixing shear is believed to occur between the mixer wall and the disk edge. The resulting mixture is continuously discharged from outlet (3) of the continuous mixer (100) and fed to the feed inlet (95) of a vented twin-screw extruder 102 (L/D=10) (e.g. a DongSeo Machinery CO., Ltd -Korea) which is used as a de-airer. The water, volatiles, and air present in the mixture are continuously removed by the imposition of a vacuum within the vented twin-screw extruder through the vacuum vent opening (94). In addition, an additive port (108) is provided for the introduction of a fungicide. The final product ejected from twin-screw de-airer (102), is continuously discharged and transferred to a cooler (99) and subsequently packaged in appropriate storage vessels.

Prior to the present invention, the adhesion promoter, for example, the reaction product of an aminoalkylalkoxysilane with an epoxyalkylalkoxysilane and optionally an alkylalkoxysilane, and where required a silicone-glycol rheological additive, were fed into the continuous mixer (100) by way of inlet 9, such that surface active filler, SCP mixture and adhesion promoter were introduced into the mixer at substantially the same time.

In the present invention, the adhesion promoter is not added at inlet (9) but is introduced into the lower region of continuous mixer (100) at an inlet port (110) as seen on FIG. 2 or alternatively in combination with a fungicide at inlet (108) in twin screw de-airer (102), the latter being preferred. A rheological additive is preferably still added through port (9) but may be added in combination with the adhesion promoter at inlet port (110) or inlet (108). Furthermore whilst inlet (108) is positioned prior to vacuum vent (94) in FIG. 2 it is to be appreciated that the adhesion promoter may be introduced either prior to or after vent (94) in the twin-screw de-airer. (102).

The present invention will now be further described by the following non-limiting examples.

EXAMPLES

Example 1

This example was used to compare the adhesive characteristics of sealant compositions made on the continuous mixer (100) in the system described in FIG. 2, with the adhesion promoter added from a variety of different inlets. Table 1 indicates the compositions used measured in parts by weight. The polymer was an ethyltriethoxysilyl terminated polydimethylsiloxane with a viscosity of 60000 mPa·s (pol), the plasticiser was trimethylsilyl terminated polydimethylsiloxane with a viscosity of 100 mPa·s (plas). The catalyst used was a tetra tertiary butyl titanate (TtBT), the organosilane cross-linker was isobutyltrimethoxysilane (iBTMS), the surface active filler was CAB-O-SIL LM150 undensified fumed silica (ex Cabot), the rheological additive was a silicone-glycol indicated in Table 1 as RA1 the adhesion co-promoter AP1 was the reaction product of a γ-aminopropyltriethoxysilane, γ-glycidoxypropyl-trimethoxy-silane and methyltrimethoxysilane, the adhesion promoter AP 2 was a 1,3,5-tris(trimethyloxysilylpropyl)-isocyanurate, Y11597 (ex Witco) and the fungicide was vinyzene BP 5-5 PG 1000.

TABLE 1

| Run | pol | Plas | TtBT | iBTMS | LM-150 | RA1 | AP1 | AP2 | Vinyzene |
|---|---|---|---|---|---|---|---|---|---|
| C1 | 50 | 34.5 | 2.2 | 2.2 | 12.0 | 2.00 | 0.0 | 0.0 | 0.3 |
| C2 | 50 | 34.5 | 2.2 | 2.2 | 12.0 | 2.00 | 0.8 | 0.0 | 0.3 |
| C3 | 50 | 34.5 | 2.2 | 2.2 | 12.0 | 2.00 | 0.8 | 0.4 | 0.3 |
| 4 | 50 | 34.5 | 2.2 | 2.2 | 12.0 | 2.00 | 0.8 | 0.4 | 0.3 |
| 5 | 50 | 34.5 | 2.2 | 2.2 | 12.0 | 2.00 | 0.8 | 0.4 | 0.3 |
| 6 | 50 | 34.5 | 2.2 | 2.2 | 12.0 | 2.00 | 0.8 | 0.4 | 0.3 |

Run C1, C2 and C3 are all comparative runs wherein in C1 no adhesion promoters were used in the composition, in C2 only adhesion promoter AP1 was added through inlet (9) and in C3 a mixture of AP2 and AP1 was added through inlet (9) and hence concurrent with the other ingredients. Runs 4, 5,and 6 are exemplary of the invention in that in run 4 AP 1 and AP2 were both introduced into continuous mixer (100) through inlet (110) in run 5 the AP1 and AP2 were introduced into the reaction mixture in combination with fungicide at inlet (108) on twin screw de-airer (102). Run 6 had both AP1 and AP2 added in a Drais mixer subsequent to the mixing process described above. Adhesion tests were undertaken using the products obtained by the above processes. Adhesion was measured on a variety of substrate samples treated with the compositions and cured for 1 week at room temperature (dry cure) or for 1 week at room temperature and one week of water immersion dry/wet cure). Prior to application the substrates were cleaned with an isopropanol/acetone mixture. Adhesion was assessed using the bead test (CTM 1007) whereby subsequent to curing the beads were pulled at 90° and the failure was rated as follows:

0: adhesive failure—poor adhesion)
1: boundary or mixed mode (adhesive/cohesive) failure—acceptable adhesion.
2: cohesive failure—excellent adhesion The plastics adhesion data presented in table 2 are the average results for dry wet curing obtained on different substrates, namely: 10 unplasticised polyvinyl chloride samples (ex. KOMMERLING, REHAU, SALAMANDER, VEKA, LG, KCC, SOLVIN and, ALUPLAST); 7 polyester coated aluminium (PCA) samples (obtained from DUPONT, AKZO-NOBEL) and 2 polyvinylidene fluoride coated aluminum samples.

TABLE 2

(Dry/Wet average on several substrates)

| Run | UPVC 10 dry/wet | PCA 7 dry/wet | PVF2 2 dry/wet |
|---|---|---|---|
| C1 | 0.0 | 0.1 | 0.0 |
| C2 | 0.1 | 0.3 | 0.0 |
| C3 | 0.3 | 0.6 | 0.0 |
| 4 | 0.5 | 0.6 | 0.0 |
| 5 | 1.7 | 1.1 | 0.3 |
| 6 | 1.3 | 0.9 | 0.3 |

As expected, the Run C1 shows very poor plastics adhesion due to the absence of any specific silane adhesion promoter. Adhesion to all substrates is enhanced by the presence of AP2 and the best results are obtained when AP1 and AP2 are introduced into the mixture in de-airer (102). These results indicate that the later the adhesion promoter is added, the better the results.

Example 2

Additional adhesion trials were carried out on samples prepared by way of Run 5 described in Example 1, on various uPVCs from KOMMERLING, REHAU (2 types), SALAMANDER, VEKA (3 types), LG, KCC, SOLVIN, ALUPLAST, BASF, VINIDUR (2 types) showing perfect dry adhesion. After water immersion, 100% cohesive failure was achieved with the samples from KOMMERLING, REHAU, VEKA, LG, KCC, SOLVIN, ALUPLAST. The adhesion performance was superior to Durasil® W15-2000, a commercially available sealant (Dow Corning), particularly after water immersion. Run 5a used a white sealant which was identical with the composition made for run 5 but which had a titanium dioxide pigment paste added when the resulting product was being packaged into cartridges.

TABLE 3 uPVC adhesion data: dry/wet average: FJM#C" (uPVC window frame)

| Run | colour | RT | Average ALL H2O |
|---|---|---|---|
| W15-2000 | clear | 1.6 | 1.0 |
| Run 5 | clear | 1.7 | 1.4 |
| Run 5a | white | 1.7 | 1.2 |

That which is claimed is:

1. A process for making an organopolysiloxane composition comprising mixing the following components i) a polymer having not less than two groups bonded to silicon which are hydroxyl or hydrolysable groups or a partial condensate thereof;
ii) a surface active filler;
iii) an organosilane having at least two silicon bonded reactive groups;
iv) a catalyst; and
v) an adhesion promoter characterized, in that, the organosilane (iii), the catalyst (iv) and the polymer (i) are mixed together prior to adding the filler (ii) and that the organosilane (iii) is mixed with the surface active filler (ii) prior to the introduction of the adhesion promoter (v).

2. A process according to claim 1, in which the adhesion promoter (v) has at least one hydrolyzable group and has the formula wherein
R' is selected from the group consisting of alkyl and haloalkyl radicals having up to 8 carbon atoms;
Q is selected from the group consisting of saturated, unsaturated and aromatic hydrocarbon radicals functionalized by a functional group selected from the group consisting of amino, mercapto, ether, epoxy, isocyanato, cyano, isocyanurate, acryloxy and acyloxy groups and mixtures thereof; and q is 0 to 3.

3. A process according to claim 2 in which the adhesion promoter (v) comprises a compound of formula wherein one D substituent is $-R_y-Si-(R')_x(OR')_{3-x}$, in which R is selected from the group consisting of alkylenearylene, alkylene, cycloalkylene and halo-substituted derivatives thereof:
R' is selected from the group consisting of alky and haloalkyl radicals having up to 8 carbon atoms;
x is from 0 to 2; and
y is 0 or 1; and
the remaining D substituents are independently selected from the group consisting of
(i) $-R_y-Si-(R')_x(OR')_{3-x}$
(ii) a styryl radical,
(iii) a vinyl group,
(iv) an allyl group,
(v) a chloroallyl group and
(vi) a cyclohexenyl group.

4. A process according to claim 2, in which the adhesion promoter (v) is 1,3,5,tris(trimethoxysilylpropyl)isocyanurate.

5. A process according to claim 1, in which the surface active filler (ii) is selected from the group consisting of silica, titania, zinc oxide, clays, mica and precipitated calcium carbonate.

6. A process according to claim 1, in which the organosilane (iii) is a cross-linker.

7. A process according to claim 1, in which the organosilane (iii) is an alkoxy silane selected from the group consisting of methyl trimethoxy silane, vinyl trimethoxy silane, methyl triethoxy silane, and vinyl trimethoxy silane, isopropyl trimethoxy silane, propyl trimethoxy silane, phenyltrimethoxysilane, tetraethoxysilane and isobutyl trimethoxy silane.

8. A process according to claim 1, in which the polymer (i) is an organopolysiloxane having polydiorganosiloxane chains according to the general formula —$(R^2_2SiO)_t$, wherein each $R^2$ is independently selected from the group consisting of methyl and ethyl groups and t has a value of from 200 to 1500, the organopolysiloxane being terminated by at least one group selected from the group consisting of —$Si(R^2)_c(OH)_{3-c}$; —$Si(R^2)_d(OR^3)_{3-d}$; and —$Si(R^2)_2$—$R^4$—$Si(R^2)_k(OR^5)_{3-k}$ wherein each $R^2$ is independently selected from the group consisting of methyl and ethyl groups;

each $R^3$ is independently selected from the group consisting of alkyl and oxyalkyl groups in which the alkyl groups have up to 6 carbon atoms;

$R^4$ is a divalent hydrocarbon group which may be interrupted by one or more siloxane spacers having up to 6 silicon atoms;

each $R^5$ is independently an alkyl group having up to 6 carbon atoms; and each c, d and k have the value of 0, 1, or 2.

9. A process according to claim 1, which process is a batch process comprising the steps of:

a) loading the polymer (i), the organosilane (iii) and the catalyst (iv) into an appropriate mixer and mixing thoroughly to form a blend;

b) adding the surface active filler (ii) into the blend and ensuring that it is thoroughly dispersed for a predetermined period of time; and c) adding the adhesion promoter (v) and mixing until a final product is sufficiently homogeneous;

in which the mixture resulting from step (b) and/or the final product of step (c) undergoes a devolatilizing step.

10. A process according to claim 1, which process is a continuous process utilizing a screw extruder having two mixing zones interlinked by an external residence zone comprising the steps:

a) mixing the polymer (i), the catalyst (iv) and the organosilane (iii) in the first mixing zone prior to the introduction of the surface active filler (ii);

b) introducing the surface active filler (ii) into the mixture resulting from step (i) in the first mixing zone and mixing until thoroughly dispersed, prior to entry into the external residence zone; and c) introducing one or more adhesion promoters (v) into the second mixing zone.

11. A process according to claim 1, which process is a continuous process comprising supplying a) a premix of the polymer (i), the organosilane (iii) and the catalyst (iv), and b) the surface active filler (ii), to a continuous mixing apparatus comprising a body casing (1, 1a, 1b) having a mateial feed opening at the top of said casing (8, 14, 9), a mixture discharge outlet (3) at the bottom of said casing (1, 1a, 1b), a rotating disk (11) within the casing (1, 1a, 1b); and an upper mixing compartment (10) above said rotating disk (11) and a lower mixing compartment (12) below said rotating disk; wherein the premix (a) is mixed with the surface active filler (ii) in the upper mixing compartment (10) by rotation of the disk (11) to form a mixture, the mixture is transferred to the lower mixing compartment (12) and one or more adhesion promoters (v) is/are added prior to, subsequent to or concurrent with discharging the mixture through the discharge outlet (3).

12. A process according to claim 11, in which subsequent to discharging the mixture, the mixture is de-aired in a de-airer (102) and the adhesion promoter (v) is introduced into the mixture during passage of the mixture through the de-airer (102).

13. A process according to claim 1 in which the adhesion promoter (v) is selected from the group consisting of aminoalkylalkoxy silanes, epoxyalkylalkoxy silane, mercaptoalkylalkoxy silanes and reaction products of an epoxyalkylalkoxy silane with an amino-substituted alkoxysilane and an alkylakoxysilane.

14. A process according to claim 2 in which the adhesion promoter (v) is selected from the group consisting of aminoalkylalkoxy silanes, epoxyalkylalkoxy silanes, mercaptoalkylalkoxy silanes and reaction products of an epoxyalkylalkoxy silane with an amino-substituted alkoxysilane and an alkylalkoxysilane.

* * * * *